US006942442B1

(12) United States Patent
Green

(10) Patent No.: US 6,942,442 B1
(45) Date of Patent: Sep. 13, 2005

(54) ROOT BALL PRESERVING AND TRANSPLANT FACILITATING HORTICULTURAL CONTAINER AND METHOD

(76) Inventor: Ken Joseph Green, 2806-42nd St. E., Bradenton, FL (US) 34208

(\*) Notice: Subject to any disclaimer, the term of this patent is extended or adjusted under 35 U.S.C. 154(b) by 162 days.

(21) Appl. No.: 10/383,802

(22) Filed: Mar. 7, 2003

(51) Int. Cl.[7] ............................................. A01C 11/00
(52) U.S. Cl. ............................ 414/23; 47/76; 111/114; 111/919; 414/800
(58) Field of Search ........................... 47/76; 111/100, 111/114, 919; 414/23

(56) References Cited

U.S. PATENT DOCUMENTS

| 3,782,773 A | * | 1/1974 | Mason ........................... 296/3 |
| 4,454,683 A | * | 6/1984 | Schauer et al. ................ 47/76 |
| 5,359,809 A | * | 11/1994 | Johnson ......................... 47/73 |
| 5,791,269 A | * | 8/1998 | Oldford ....................... 111/100 |

\* cited by examiner

Primary Examiner—Janice L. Krizek
(74) Attorney, Agent, or Firm—Dorothy S. Morse

(57) ABSTRACT

A low-profile container with a wide flat bottom for use in transplanting trees and other large plants with minimal disruption to the root ball. It typically has a diameter dimension of approximately four feet or more, with the minimum contemplated diameter dimension being approximately one-and-one-half feet, as well as arcuate side walls and at least one sturdy ring on its outside surface that is configured for lifting the combined weight of the container, plant, and root ball. A plant would be grown in the container, transported to its intended planting location in the container, and then transplanted into a pre-dug hole with the assistance of the container. Optionally, the container also may have drainage holes adjacent to or through its bottom surface and obliquely positioned anchoring passages that assist in maintaining the plant and container in an upright position in the presence of strong winds.

20 Claims, 3 Drawing Sheets

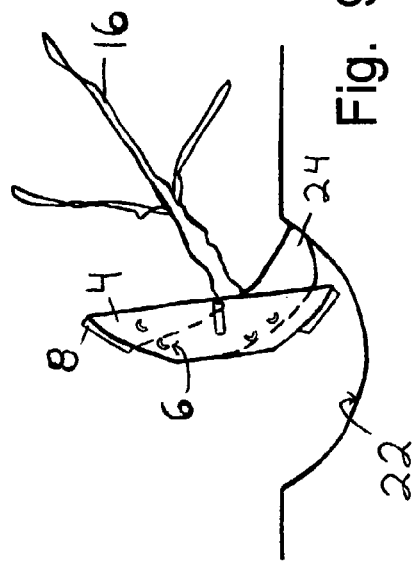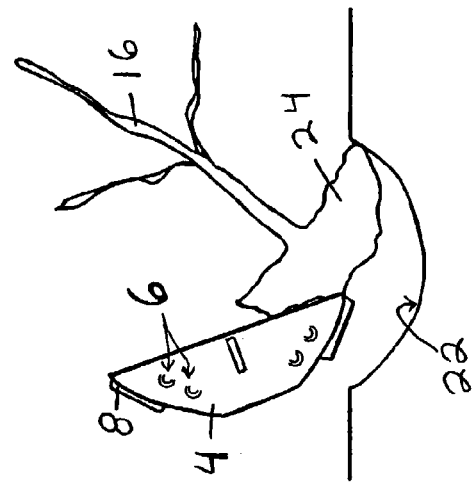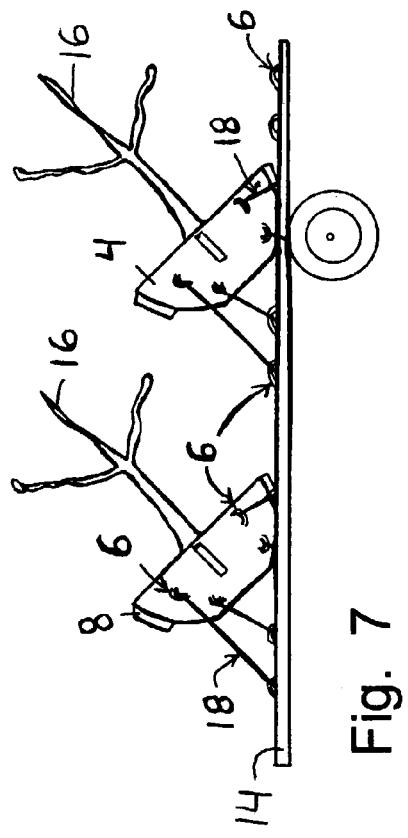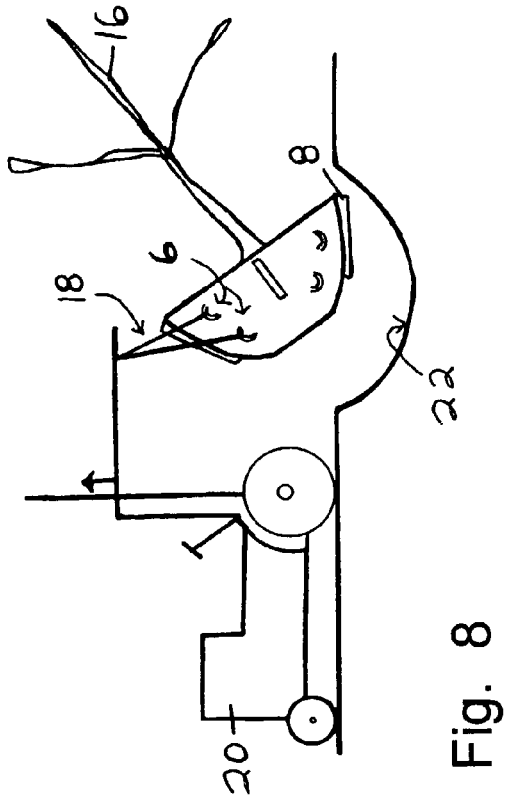

ROOT BALL PRESERVING AND TRANSPLANT FACILITATING HORTICULTURAL CONTAINER AND METHOD

CROSS-REFERENCES TO RELATED APPLICATIONS

None.

BACKGROUND OF THE INVENTION—FIELD OF THE INVENTION

This invention relates to the field of devices used to transplant trees and other large plants with minimal disruption to the root ball, specifically to a flat-bottomed container having side walls with an arcuate configuration for optimizing root ball development when used as a growth container prior to transplant, and at least one sturdy ring on its outside surface that is configured for lifting the combined weight of the container, plant, and root ball, which for very large plants and containers will be well in excess of one hundred pounds. When more than one ring is present, although not critical and not limited thereto, the rings can be horizontally distanced from a next adjacent ring, positioned vertically above or below another ring, and/or placed at uniformly spaced-apart positions about the container's outside surface. One application of the present invention is for a large plant or tree to be grown in the present invention container until a desired transplant size is achieved, where its arcuate side walls provide an optimized non-restrictive root growing area. The combined tree and container are then transported by truck or other transport device such as a trailer to its intended transplanting location in the container. Thereafter, the present invention container and its associated tree or plant are moved to a pre-dug hole at the transplanting location using one or more of its sturdy rings and the assistance of a forklift connected thereto, or other machine capable of lifting and moving the combined weight of the container, plant, and root ball. Then, once the forklift or other lifting equipment through use of its ring connection to the present invention container positions it over the pre-dug hole and rotates its raised side into a more perpendicular orientation relative to the ground surface below, gravity will cause the root ball to slide out of the container and into the pre-dug hole. Optionally, the upper edge of the container can be used to catch the lip of the pre-dug hole for assistance in vertically rotating the present invention container and thereafter centering the root ball within the pre-dug hole. Another application of present invention containers is use at construction sites for preserving large plants and mature trees, and moving them to new locations and/or temporarily housing the trees and plants until they can be replaced in their original positions. By protecting the root balls of such permanently or temporarily relocated trees and plants, and helping the root balls to remain intact during transport, the present invention containers enhance the opportunity for transplant success. Typically, the present invention containers have a diameter dimension of approximately four feet or more, with the minimum contemplated diameter being approximately one-and-one-half feet. Optionally, the container also may have one or more drainage holes near to or through its bottom surface, as well as anchoring means that assist in maintaining the plant and container in an upright position in the presence of strong winds, although the curved configuration of the container's outside surface provides some self-righting assistance to the container and plant therein even when no anchoring means is present. Such anchoring means can include, but is not limited to, one or more anchoring passages through which a stake may be driven at an angle into the ground supporting the container.

BACKGROUND OF THE INVENTION—DESCRIPTION OF THE RELATED ART

When plants are moved from one location to another, more often than not they must adapt to differences in growth factors, such as light, available moisture, soil nutrients, and root drainage, or a combination thereof. Some plants adapt to these differences more readily than others. Should a plant's roots and foliage be damaged during the transplant process, this places an extra burden on the plant while it is attempting to adapt to its new location. However, a majority of a plant's roots can be protected from abrasion, stretching, being crushed or ripped apart, and/or other forms of damage, if a large root ball is preserved around the base of a plant prior to and during its move to a new location. When a large root ball remains intact, moisture and nutrient uptake are more readily available to the upper plant structure during the adjustment period following transplant via the substantially undisturbed root system, providing an enhanced opportunity for transplant success. While a root ball is easily preserved around the base of small plants, handling problems are encountered with larger trees and plants, which together with the size of root ball needed for improved transplant success, can weigh several hundred pounds. The reusable present invention root-ball-preserving container can be used to start plants and grow them to the desired size for transplant, or in the alternative, a large plant or tree can be dug up with a tree spade or other equivalent equipment and placed in one of the present invention containers for transport to a new location, where the present invention container can optimally be used to ease the intact root ball into a pre-dug hole at the transplant location. The commonly used cylindrical plant containers, with their substantially straight side walls, as distinguished from the arcuate walls of the present invention, often require plants to be pulled therefrom for root release prior to transplanting, which can cause a disruption of the root ball. Also, large plants and trees can be damaged upon installation when a lifting strap is secured around their trunks and used for lifting them vertically out of a straight-walled container. In contrast, the optimized non-restrictive root growing area provided by the convex walls of the present invention encourage a well-developed root ball and a means for gravity-assisted release of the root ball into a pre-dug transplant hole, which preserves the root ball and reduces the opportunity for root system damage during relocation.

The prior art thought to be the most closely related to the present invention is the invention disclosed in U.S. Pat. No. 5,496,143 to Breyer (1996). Both the Breyer invention and the present invention are tree and large shrub lifting apparatus for use in transplant operations. However, there are important differences between the Breyer invention and the present invention. The Breyer invention is a wheeled handcart having a handle on one end and a set of plant-lifting hooks in an opposed position. Once the plant's root ball is secured with the hooks, an operator can employ the handle to move the plant to a new location. The Breyer invention can also be upended to assist in plant placement within a pre-dug hole at the transplant site. The size of plant used with the Breyer invention is limited by the operator's physical ability to move the combined weight of the cart, plant, and root ball. In contrast, the present invention comprises a flat bottomed container with arcuate walls and sturdy attachment means, such as but not limited to sturdy and rugged C-rings, which allow the present invention container to be lifted by a forklift, crane, bucket lift, or other mechanical lifting device, for placement in an open transport vehicle or on a trailer, as well as movement from the transport vehicle or trailer to a pre-dug hole at the transplant site. While the present invention has no wheels, the Breyer invention has no sturdy/rugged fastening means on its outside surface, as does the present invention, that allow it to be lifted by a forklift or other lifting device. Further, the Breyer invention is not configured for plant cultivation and has no securing means for ground stabilization, such as the anchoring passages of the present invention that assist in maintaining the plant therein in an upright position in the presence of strong and/or gale force winds. Further, since a forklift is able to suspend the present invention container above the ground surface in an orientation that places the plant therein into a nearly parallel position relative to the ground surface, gravity is able to cause the root ball within the container to slide beyond the lowermost portion of its arcuate wall and become released from the container. Also, depending upon the size of the present invention container and plant, the upper edge of the pre-dug hole may be used to assist in centering the root ball within the pre-dug hole as the container is lifted away from the root ball, thereby transferring an intact root ball from the container in a manner not taught by the Breyer invention. There is no apparatus or method known for transplanting trees and large plants that has the same features and components as the present invention, nor all of its advantages.

BRIEF SUMMARY OF THE INVENTION—OBJECTIVES AND ADVANTAGES

The primary object of this invention is to provide a root ball preserving method and container for transplanting trees and other large plants that improves transplant success. It is also an object of this invention to provide a transplant container that can be used as growth container for a tree or large plant until it reaches a pre-determined transplant size. It is a further object of this invention to provide a transplant container with a non-restrictive growing area that optimizes root ball development when it is used for growing large plants prior to transplant. A further object of this invention is to provide a transplant container for trees and large plants that employs gravity to assist in transferring the root ball therein into the targeted hole at a transplant site. It is a further object of this invention to provide a transplant container for trees and large plants that helps to maintain the tree or large plant therein in an upright orientation in the presence of strong and/or gale force winds. It is also an object of this invention to provide a transplant container for trees and other large plants that is sufficiently rugged to hold and support three or four hundred pounds of weight when elevated above the ground. A further object of this invention is to provide a transplant container for trees and large plants that can be easily secured in a fixed position for transport to a transplant site and easily returned to an upright position if a non-vertical orientation is required during transport. It is also an object of this invention to provide a transplant container for trees and large plants that is made from non-corroding, non-brittle, rugged, and durable materials for extended and repeat use.

As described herein, properly manufactured and used, the present invention would prevent the roots of a tree or large plant from being subjected to abrasion, stretching, being crushed, being ripped apart, and/or other forms of damage during its relocation, thus improving the opportunity for transplant success. The present invention comprises a low-profile flat-bottomed container having convexly arcuate walls with a configuration that allows it to be easily returned to an upright position if it is tipped over by the wind or placed in a non-vertical orientation for transport. The sturdy ring or rings on its outside surface allow the present invention to be easily secured for lifting or transport. Each ring must be configured for lifting the maximum anticipated weight of the container, plant, and root ball. Although not limited thereto, the use of a minimum of four to six spaced-apart rings on a present invention container is preferable as it permits faster and more efficient attachment to transport equipment in nursery applications where placement of plant containers is expected to be in close proximity to adjacent containers. Optionally, additional anchoring means such as but not limited to anchoring passages through which a stake may be driven at angle into the ground, can be incorporated into the outside surface of the container to help it remain in place and upright when subjected to strong and/or gale force winds. It is contemplated for the present invention containers to be made from plastic materials, or other rugged, durable, and non-corroding materials, that would allow them to remain intact and unaffected by weathering conditions over the extended period of time needed for a tree or large plant to reach transplant size, and then be used again for the growth of at least one or more subsequent trees or large plants. Holes near to the bottom of the present invention container, and/or through it, would assist in maintaining proper root drainage during the growth period. When a plant in a present invention container is transferred into a pre-dug hole at a transplant site, gravity does the work. The forklift or other mechanical lifting device used to carry the heavy container to the transplant site would orient the present invention container above the hole. Optionally, it may also place one side of the container in contact with the lip of the hole so that as the container is slowly lifted away from the hole, depending upon the size of the present invention container and plant, the root ball can catch the upper edge of the hole and thereafter allow gravity to force the heavy root ball to slide over and beyond the lower portion of the arcuate wall of the container, and thereafter drop into the pre-dug hole. While the present invention container may not be needed for plants having a root ball with a small diameter dimension, such as one-and-one-half feet or less as such root balls can usually be lifted for transplant without mechanical assistance, the maximum diameter dimension possible for the present invention is primarily limited only by the type of equipment available for its transport. However, a preferred diameter dimension for many applications of the present invention container is approximately four feet, which can support a root ball weighing several hundred pounds. When trees and large plants are grown in the present invention container, and the size of present invention container selected for use is proportioned to the type of tree or plant to be grown and the size of plant needed at the end of the growth period, the acruate wall configuration of the present invention container will provide an optimized non-restrictive growing area that allows the plant's roots to substantially fill the present invention container without being root-bound or extending through any drainage holes present, thereby allowing the roots to more successfully hold together as a root ball below the base of the tree or plant. The root ball thus formed by the acruate wall configuration of the present invention container is then allowed during the transplant process to slide intact, via the force of gravity, from the present invention container and into a pre-dug hole. The non-restrictive growing area provided by the present invention container also allows for larger root ball development than would be achieved in a straight-walled container of the same height or interior volume, which in turn gives the tree or plant better transplant success. Thus, due to the fact that larger root ball development can be achieved and the root ball is preserved during transplant, use of the present invention gives the tree or large plant a better opportunity to adapt to its new surroundings, and transplant success is significantly improved.

While the description herein provides preferred embodiments of the present invention transplant container, it should not be used to limit its scope. For example, variations of the present invention, while not shown and specifically described herein, can also be considered within the scope of the present invention, such as variations in the size of the C-rings; the configuration, positioning, size, and number of drainage holes used; the number, size, and location of anchoring passages, when used; and the thickness and type of material used for the present invention container, its anchoring passages, and C-rings or other fastening means. Thus, the scope of the present invention should be determined by the appended claims and their legal equivalents, rather than being limited to the examples given.

BRIEF DESCRIPTION OF THE SEVERAL VIEWS OF THE DRAWINGS

FIG. 7 is a side view of the second preferred embodiment of the present invention being transported on a trailer with each container having a plant therein and being secured with cords, cables, or tie-down straps attached between its C-rings and several attachment points on the trailer.

FIG. 8 is a side view of the second preferred embodiment of the present invention being used to install a tree in a pre-dug hole, with the present invention container suspended at an angle above the hole, and a forklift having a cable, tie-down strap, or cord connection to one or more of the container's C-rings being in the process of elevating one side of the present invention container before the root ball begins to slide out of the container and into the hole.

FIG. 9 is a side view of the second preferred embodiment of the present invention being used to install a tree in a pre-dug hole, with the container up-ended, the gravity-assisted root ball starting to slide out of the present invention container, and the lowermost edge of the root ball in contact with the upper edge of the hole.

FIG. 10 is a side view of the second preferred embodiment of the present invention being used to install a tree in a pre-dug hole, with the root ball nearly released from the present invention container and poised to fall straight into the hole as the up-ended container is drawn away from the still raised adjacent edge of the root ball.

DETAILED DESCRIPTION OF THE INVENTION

Figure 1:
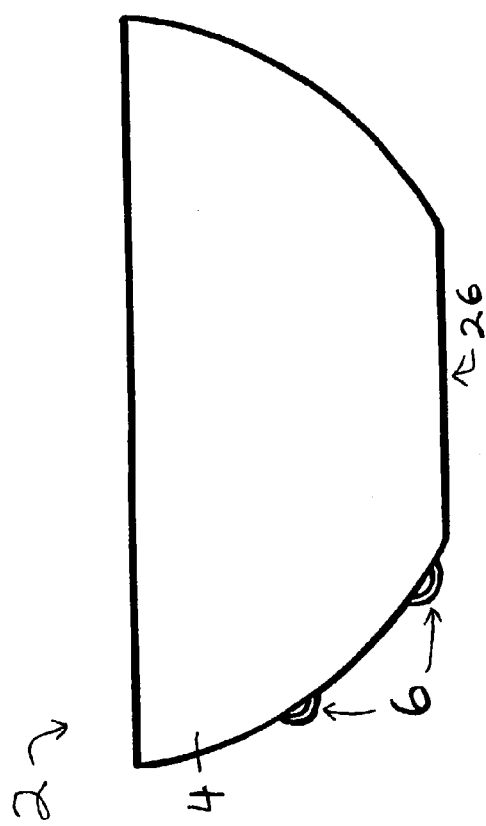
FIG. 1 is a side view of the most preferred embodiment of the present invention having a flat bottom surface, convex walls, and more than one C-ring.

The present invention root ball preserving containers 2 can be used to start a tree, such as tree 16 in FIGS. 7–10, as well as other large plants and grow them several years, or more, to the desired size for transplant, or in the alternative, a large plant or tree can be dug up with a tree spade or other equivalent equipment (not shown) and placed in one of the present invention containers 2 for temporary storage and/or transport to a new location, as well as assistance in easing an unbroken root ball 24 into a pre-dug hole 22 at the transplant location. Preservation of root ball 24 is desired during transplant, as it increases the opportunity for transplant success. Typically, the present invention containers 2 have a minimum contemplated diameter of approximately one-and-one-half feet, and a maximum preferred diameter dimension of approximately four feet or more, with the maximum diameter dimension being primarily limited only by the type of equipment available for its transport. Trees and plants in containers less than one-and-one-half feet in diameter usually are not heavy enough to require mechanical lifting. Further, present invention containers 2 must have a rugged construction capable of withstanding being lifted by mechanical equipment, such as forklift 20 in FIG. 8, while supporting several hundred pounds of tree/plant 16 and root ball 24 weight. It is further intended for the present invention container 2 to be made from materials that do not add an undue amount of additional weight to that which must be lifted by C-rings 6. Also, the low-profile and low center of gravity configuration of present invention containers 2 with their flat bottom surfaces 26 and convex outside surfaces 4 allows them to be easily righted after they have been tipped, and also assists in maintaining an upright orientation during windy conditions, even without anchoring with straps (such as tie-down straps 18 in FIG. 7) connected to C-rings and secured either to anchoring points on a trailer or to the ground, or the use of stakes (such as stakes 10 in FIG. 4).

Figure 5:
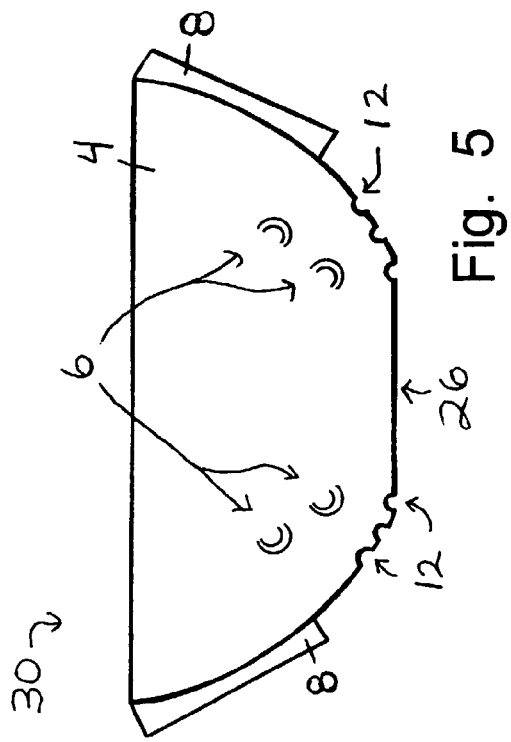
FIG. 5 is a side view of a second preferred embodiment of the present invention having at least four C-rings, two anchoring passages, a flat bottom surface, convex walls, and six drainage holes in the lower portion of the walls near to the flat bottom surface.

FIG. 1 shows a first preferred embodiment of the present invention 2 having a wide flat bottom surface 26, a convex outside surface 4, and two C-rings 6. The curvature of convex outside surface 4 allows for easy tipping of present invention 2 for efficient strapped-down transport to a transplant site, however, once tipped, the curvature of convex outside surface and low center of gravity provided by wide flat bottom surface 26 is such that present invention container 2 is easily returned to its upright orientation unless tethered. The number of C-rings 6 used on each present invention container 2 is not critical, however, the placement of C-rings 6 must allow for suspension of present invention container 2 from its outside surface 4 in a position suitable for sufficient upending of container 2 to allow gravity-assisted transfer of root ball 24 into the intended planting hole, such as hole 22 in FIGS. 8–10. When more than one C-ring 6 is present, although not limited thereto, the C-rings 6 can be horizontally distanced from a next adjacent C-ring 6, positioned vertically above or below another C-ring 6, and/or placed at uniformly spaced-apart positions about the outside surface. Although only a "C" configuration is shown and preferred for C-rings 6, the shape is not critical, and other shapes that are sturdy, rugged, and provide for secure and confident lifting of present invention container 2 above the ground and tipping of the present invention container 2 into the near vertical orientation required for gravity-assisted transfer of a root ball 24 therein into its targeted hole 22 are also allowed, such as but not limited to a rectangular, oval, non-symmetrical, and tapering configurations. The size of C-rings 6 is also not critical, as long as each C-ring 6 is capable of performing its lifting function and not so large as to add cost or weight to the present invention container 2 without appropriate benefit. It is even possible for more than one size of C-ring 6 to be used on a single present invention container 2 where appropriate to the intended application. Although no drainage holes such as drainage holes 12 in FIG. 5 are visible in the first embodiment of the present invention container 2 shown in FIG. 1, it is contemplated for the most preferred embodiments of the present invention to have at least one drainage hole 12 for removal of excess moisture from root ball 24. FIG. 1 shows the diameter dimension of flat bottom surface 26 being greater than the height dimension of convex outside surface 4. The combination of wide bottom surface 26 and resulting low profile formed by the arcuate outside surface 4, assists in providing a low center of gravity and some resistance to tipping in the presence of strong winds (not shown) and a self-righting tendency when moved from an upright position. Additional resistance to tipping can be provided by anchoring means, such as but not limited to anchoring passages 8 in FIG. 3. Further, when present invention transplant container 2 is used for growing large plants prior to transplant, the wide bottom surface 26 and relatively low profile of its convex outside surface 4 provide a non-restrictive growing area that optimizes root ball development by allowing a larger root ball to develop than would otherwise be created in an upstanding cylindrical plant container (not shown) of the same height dimension or interior volume. The present invention containers 2 should be made from non-corroding, non-brittle, rugged, and durable materials, such as but not limited to a UV-resistant plastic material, that would allow them to remain intact, virtually maintenance-free, and unaffected by weathering conditions over the extended period of time needed for a tree 16 or other large plant (not shown) to reach transplant size, and then be used again for the growth of at least one or more subsequent trees 16 or large plants. Further, where cost/benefit is favorable, recycled materials can be used. While the thickness and type of material or combination of materials used for the present invention container 2 is not critical, in larger containers having a diameter dimension of approximately four feet or more, the thickness and type of material used must be capable of supporting several hundred pounds of weight while suspended above ground. Although it is contemplated for several sizes of present invention container 2 to be manufactured for different sizes of trees 16 and large plants, the container 2 preferred for use in each application should be selected according to its ability to accommodate the amount of root development expected during a predetermined growth period without any repotting, root trimming, or other interim physical maintenance besides regular watering, and application of nutrients and pesticides when needed.

Figure 2:
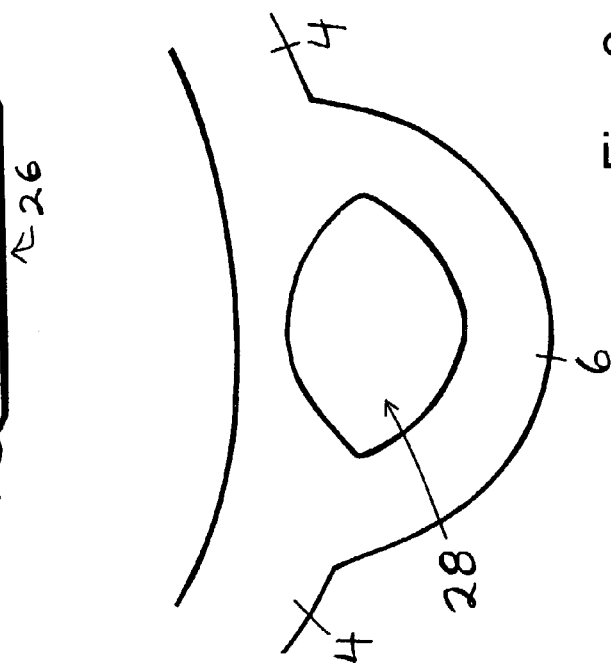
FIG. 2 is an enlarged top view on one of the C-rings shown in FIG. 1.

In contrast, FIG. 2 shows one of the C-rings 6 depending outwardly from convex outside surface 4. FIG. 2 shows C-ring 6 to have a sturdy construction, with its thickness dimension being greater that that of the outside surface 4 from which it outwardly depends. Although each C-ring 6 must be sturdy in construction and attachment to convex outside surface 4, as well as configured for sole support of the maximum anticipated combined weight of container 2, root ball 24, and tree 16 immediately prior to transplant, the size and shape of C-rings 6 and their respective apertures 28 are not critical as long as each C-ring 6 is able to provide secure and stable lifting of present invention container 2, as well as ample rotation of present invention container 2 into a near vertical orientation for gravity-assisted transfer of a root ball 24 into its targeted pre-dug hole 22. Also, aperture 28 must be sufficiently large for easy securing of one or more tie-down straps, cords, or cables 18 thereto prior lifting and/or transport of present invention container 2. Although FIG. 2 shows C-ring 6 having a substantially semi-circular configuration with an oval aperture 28, the configurations of each may be different from that shown, with such configurations only being limited by an ability to effectively fulfill their stabilizing and support functions. While the minimum size of each C-ring 6 is determined by its capability of lifting the maximum combined weight of the present invention container 2, tree 16, and root ball 24, its maximum size is a function of cost/benefit consideration. Although not limited thereto, the use of a minimum of four to six spaced-apart C-rings 6 on a present invention container 2 is preferred, as it permits faster and more efficient attachment to transport equipment in nursery applications, such as forklift 20 in FIG. 8, where placement of plant containers 2 is expected to be in close proximity to one another.

Figure 3:
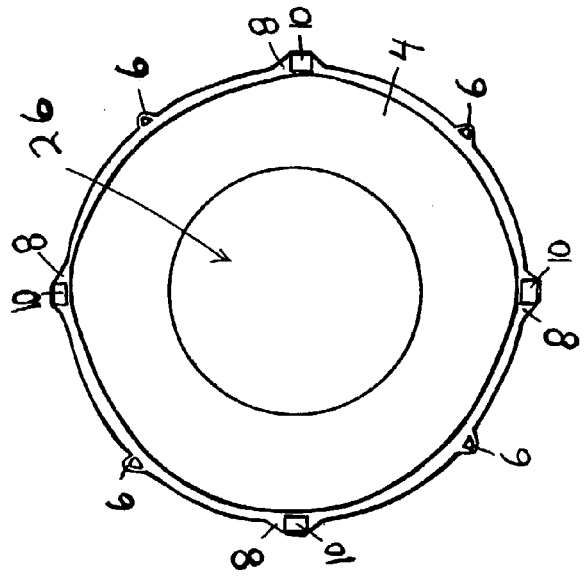
FIG. 3 is a top view of the most preferred embodiment of the present invention having four C-rings and four anchoring passages that are alternating in position and placed at equally spaced apart distances from the next adjacent ring or anchoring passage.

FIG. 3 shows the most preferred embodiment of the present invention container 2 having four C-rings 6 and four anchoring passages 8 that are alternating in position and placed at equally spaced apart distances from the next adjacent C-ring 6 or anchoring passage 8. Although not shown, one or more additional C-rings 6 could be positioned below each of the C-rings visible in FIG. 3. The number, size, and location of anchoring passages 8 are not critical and may be more or less than that shown in FIG. 3, and would be selected according to the intended application of present invention container 2. The length and width dimensions of each anchoring passage 8 would be sufficient to provide secure lateral support for the stake 10 or other anchoring means inserted therethrough. Although it is anticipated for anchoring passages to provide secure positioning for present invention containers 2, as well as the trees 16 or other large plants therein, when subjected to gale force winds, it is not expected that anchoring passages 8 would provide effective protection against hurricane strength winds or tornados.

Figure 4:
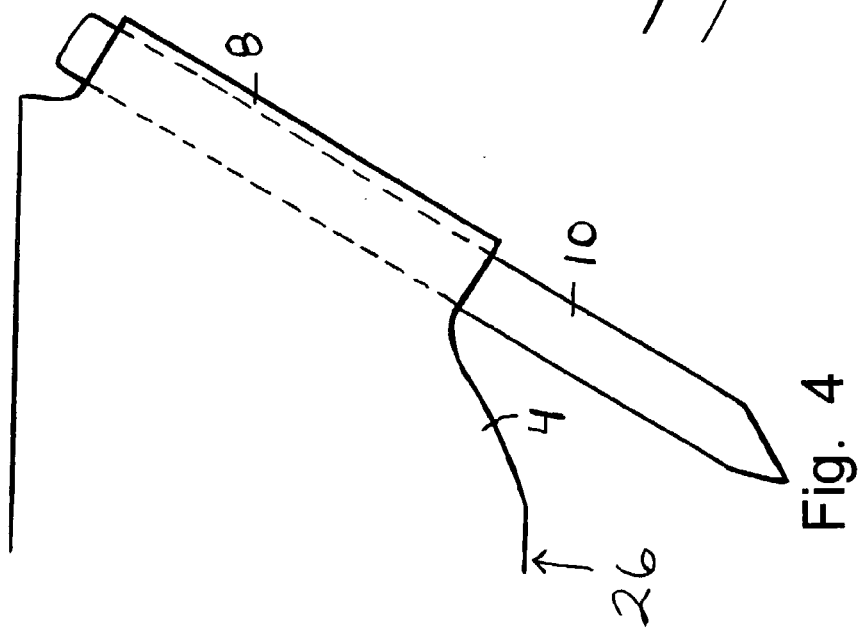
FIG. 4 is a side view of one of the anchoring passages in the most preferred embodiment of the present invention with a stake therethrough and the lower pointed end of the stake extending below the container's bottom surface for angled placement into the ground.

FIG. 4 shows one of the anchoring passages 8 in the most preferred embodiment of the present invention container 2 with a stake 10 therethrough and the lower pointed end of the stake 10 extending below the container's bottom surface 26 for angled placement into the ground (not shown) to help the container 2 remain in place and upright when subjected to strong and/or gale force winds. The amount of stake 10 extending above and below anchoring passage 8 would depend upon the application, however, a sufficient amount of stake 10 should extend above anchoring passage 8 for ease in removal of stake 10 therefrom prior to transport of container 2 to a transplant site. The amount of stake 10 extending below anchoring passage 8, as well as its diameter dimension, would be determined by the size of the present invention container 2 to which they would be attached and the ambient conditions to which it is expected for container 2 to be subjected during the growth period of a tree 16 or other large plant therein. The diameter of anchoring passage 8 is also not critical, however, it should correspond to that of the stake 10 intended for use therein so that lateral movement of stake 10 within anchoring passage 8 is kept to a minimum. The diameter of anchoring passages 8 must also be appropriate for securing the size of stake 10 required to fix the position of the associated container 2 when it is subjected to gale force winds. The cross-sectional configuration of anchoring passages 8 and stake 10 are not critical, however, they should be compatible so as to minimize lateral movement of each stake 10 within its corresponding anchoring passage 8. The angle between the longitudinal axis of each anchoring passage 8 used and bottom surface 26 can be different from that shown in FIG. 4, and it is contemplated for anchoring passages 8 on the same present invention container 2 to have the same or different angled orientation relative to bottom surface 26.

FIG. 5 shows a second preferred embodiment 30 of the present invention having four C-rings 6, two anchoring passages 8, a wide flat bottom surface 26, a convex outside surface 4, and six drainage holes 12 in the lower portion of outside surface 4 near and/or through bottom surface 26. Although not shown, the hidden side of second preferred embodiment 30 may also have a like configuration with four C-rings 6 and six drainage holes 12. However, such symmetry is not required. The number of C-rings 6, anchoring passages 8, and drainage holes 12 contemplated for the present invention is not critical and second preferred embodiment 30 may have more or less than what is shown in FIG. 5. The configuration, positioning, and spaced-apart distances of C-rings 6 relative to each other, as well as to drainage holes 12 and anchoring passages 8, are also not critical, and can vary from that shown in FIG. 5. Thus, C-rings 6 could be oriented parallel to flat bottom surface 26, perpendicular to flat bottom surface 26, or at an oblique angle relative to flat bottom surface 26. Further, drainage holes 12 can be through the flat bottom surface 26 of second preferred embodiment 30, near it, or both, and must be configured to assist in draining excess moisture from root ball 24 during the pre-transplant growth period of tree 16 or any other large plant positioned within second preferred embodiment 30. The number of drainage holes 12 used is not critical, however, more than one would typically be present for more uniform management of moisture around root ball 24. Further, the configuration and size of drainage holes 12 is not critical and limited only by the practicality of manufacture and suitability for the intended application.

Figure 6:
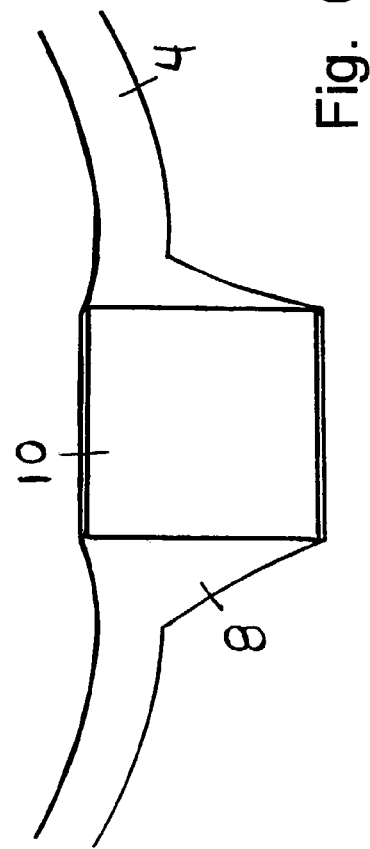
FIG. 6 is an enlarged top view of an anchoring passage in the second preferred embodiment of the present invention having a configuration allowing for insertion therethrough of a rectangular stake.

FIG. 6 shows an anchoring passage 8 in the second preferred embodiment of the present invention container 2 having a configuration suitable for allowing for insertion therethrough of a rectangular stake 10. Although use of a rectangular configuration for stake 10 is not critical, it is preferred due to widespread availability and inexpensive cost. The length of stake 10 would depend upon the intended application. Further, although it is contemplated for stake 10 to extend upwardly beyond anchoring passage 8, it is not contemplated for stake 10 to upwardly extend a significant amount beyond the upper edge of present invention container 2. FIG. 6 shows stake 10 substantially filling anchoring passage 8, and allowing for little lateral movement of stake 10 within anchoring passage 8 during use.

FIGS. 7–10 show a preferred method for using present invention container 2 for transplanting a tree 16 into a pre-dug hole 22. FIG. 7 shows two second preferred embodiments 30 being transported on a trailer 14 with each container 2 having a tree 16 therein and being secured with tie-down straps, cables, or cords 18 attached between its C-rings 6 and several attachments points on trailer 14, which also appear to have the shape of C-rings 6. No stake 10 is shown extending from any anchoring passage 8 in FIGS. 7–10, as it is generally contemplated for stakes 10 to be removed prior to transport. FIG. 8 shows container 2 being suspended at an angle above hole 22 by a forklift 20 via two cables, tie-down straps, and/or cords 18 connected between forklift 20 and two of the C-rings 6 on the raised portion of second preferred embodiment 30 prior to the time that the root ball 24 begins to slide from second preferred embodiment 30 and into hole 22. FIG. 9 shows the gravity-assisted root ball 24 starting to slide out of the present invention container 2, and the lowermost edge of root ball 24 optionally in contact with the upper edge of the hole 22, which assists in centering a very large root ball 24 within a pre-dug hole 22. Although forklift 20, or other mechanical lifting means (not shown) would still be attached with at least one cord, cable, or tie-down strap 18 to one or more C-rings 6 on the raised side of the up-ended second preferred embodiment 30, forklift 20 and cords, cables, and tie-down straps 18 are not shown in FIG. 9 for simplicity of illustration. FIG. 10 shows the root ball 24 poised and ready to fall straight into hole 22 as the up-ended second preferred embodiment 30 is drawn away from its final point of contact with the raised portion of root ball 24. Although forklift 20 or other mechanical lifting means (not shown) would still be attached to second preferred embodiment 30 by means of at least one cord, cable, or tie-down strap 18 connected to one or more C-rings 6 on second preferred embodiment 30 as second preferred embodiment 30 is finally drawn away from root ball 24 to allow root ball 24 to drop freely and intact into pre-dug hole 22, the connection of forklift 20 via cords, cables, and tie-down straps 18 to C-rings 6 is no different than that shown in FIG. 8, and has been omitted from FIG. 10 for simplicity of illustration.

During use of the most preferred embodiments of present invention container 2 and/or 30 for transferring a large plant, such as tree 16, either grown therein or temporarily stored therein prior to transplant into a pre-dug hole 22, gravity does the work of removing an intact root ball 24 from container 2. A forklift 20 or other lifting device carries the heavy present invention container 2 or 30 to the transplant site and upends it above a hole 22. Optionally, the lowermost side of container 2 or 30 may be placed in contact with the lip of hole 22 to assist in centering root ball 24 within hole 22. Then, as forklift 20 or other lifting device further rotates container 2 or 30 upwardly from hole 22, the lowermost portion of root ball 24 can be made to optionally catch the upper edge of hole 22 whereafter gravity will draw the heavy root ball 24 out of container 2 or 30 and downward into pre-dug hole 22. While the present invention container 2 or 30 may not be needed for plants or trees 16 having a root ball 24 with a small diameter dimension, such as one-and-one-half feet or less, as such root balls 24 can often be lifted for transplant without mechanical assistance, the maximum diameter dimension possible for the present invention container 2 or 30 is primarily limited only by the materials used in its manufacture and the type of mechanical equipment available for its transport. However, for many applications, a preferred diameter dimension for the present invention transplant 11 container 2 or 30 is approximately four feet, which can support a root ball 24 weighing several hundred pounds. When trees 16 and large plants are grown in the present invention container 2 or 30, their roots remain basically undisturbed during the transplant process and the acruate wall configuration of the present invention container 2 provides an optimal non-restrictive growing area that promotes larger root ball development than would occur in a straight-walled cylindrical container of similar height dimension or interior volume, which in turn gives the tree 16 or plant a better opportunity for transplant success. The size of present invention container 2 or 30 selected for such use in each application is determined by the size anticipated for plant or tree 16 at the time of transplant, so that ample room will be provided for an optimally developed root ball 24 without repotting or other form of interim maintenance or handling. Once root ball 24 is removed from container 2 or 30, it can be returned to its previous location and reused for the pre-transplant growth of additional trees 16 and large plants, or the transport/relocation of other in-ground and/or mature plants.

I claim:

1. A root ball preserving and transplant facilitating horticultural container comprising:

a vessel having an open top, a wide flat bottom surface, and arcuate side walls configured to provide said vessel with a self-righting tendency, said vessel being dimensioned for containing the root ball of a tree and other large plants, with said arcuate side walls and said wide flat bottom surface further being configured to provide a low center of gravity to maintain said vessel in an upright position without anchoring in the presence of strong winds, said arcuate side walls also having a lower half; and sturdy lifting support means outwardly depending from said arcuate side walls, said sturdy lifting support means being adapted for securing said vessel in a fixed position and lifting the combined weight of a large plant, its root ball, and said vessel above a pre-dug transplant hole, with said sturdy lifting support means also being positioned upon said lower half of said arcuate side walls so as to allow the portion of said arcuate side walls attached thereto to be raised a sufficient amount above the transplant hole and rotated for gravity-assisted transfer of a root ball positioned within said vessel into the transplant hole without disruption of the root ball.

2. The horticultural container of claim 1 wherein said sturdy lifting support means comprises at least one C-ring.

3. The horticultural container of claim 1 further comprising at least one drainage hole configured for removal of excess moisture from any root ball positioned within said vessel, with said at least one drainage hole being selected from a group consisting of drainage holes positioned through said side walls in a location adjacent to said flat bottom surface and drainage holes positioned through said flat bottom surface.

4. The horticultural container of claim 1 having a minimum vessel diameter dimension of approximately one-and-one-half feet.

5. The horticultural container of claim 1 further comprising anchoring means being adapted for maintaining said container and any plant therein in an upright position when subjected to gale force winds and wherein said anchoring means comprises at least two anchoring passages configured to allow a stake to be driven therethrough into the ground supporting said vessel at an oblique angle relative to the around, and further wherein said sturdy lifting support means comprises at least two C-rings of rugged construction, with one of said anchoring passages being disposed about said side walls between adjacent ones of said C-rings to provide a configuration of alternating C-rings and anchoring passages.

6. The horticultural container of claim 1 further comprising anchoring means outwardly depending from said arcuate side walls at an oblique angle thereto, said anchoring means being adapted for maintaining said container and any plant therein in upright positions when subjected to gale force winds.

7. The horticultural container of claim 6 wherein said anchoring means comprises at least one anchoring passage configured with a hollow interior that allows insertion therethrough of a stake.

8. The horticultural container of claim 7 wherein said anchoring passage is elongated and configured to allow a stake to be driven therethrough into the ground at an oblique angle relative to the ground surface supporting said horticultural container.

9. The horticultural container of claim 7 wherein said anchoring means is configured for insertion therethrough of a rectangular stake.

10. A root ball preserving and transplant facilitating horticultural container comprising:

an open vessel with a wide flat bottom surface and a convex outer surface contiguous with and upwardly depending from said flat bottom surface, said vessel being configured and dimensioned for containing the root balls of a tree and other large plants with said convex outer surface providing a non-restrictive growing area that promotes a well developed root ball for plants grown within said vessel prior to transplant, with said convex outer surface and said wide flat bottom surface further being configured for self-righting and with a low center of gravity to maintain said vessel in an upright position without anchoring in the presence of strong winds said convex outer surface also having a bottom half; and at least one sturdy C-ring of rugged construction outwardly depending from said outer surface, at least one said sturdy C-ring configured for lifting the combined weight of a large plant, its root ball, and said vessel above a pre-dug transplant hole, with said at least one sturdy C-ring also being positioned upon said bottom half of said outer surface so as to allow the portion of said outer surface attached thereto to be raised a sufficient amount above the transplant hole and rotated for gravity-assisted transfer of a root ball within said vessel into the transplant hole without disruption of the root ball.

11. The horticultural container of claim 10 further comprising at least one drainage hole configured for removal of excess moisture from any root ball positioned within said vessel, with said at least one drainage hole being selected from a group consisting of drainage holes positioned through said outer surface in a location adjacent to said flat bottom surface and drainage holes positioned through said flat bottom surface.

12. The horticultural container of claim 10 having a maximum vessel diameter dimension greater than four feet.

13. The horticultural container of claim 10 further comprising anchoring means depending from said outer surface, said anchoring means being adapted for maintaining said container and any plant therein in an upright position when subjected to gale force winds.

14. The horticultural container of claim 13 herein said anchoring means comprises at least one anchoring passage configured to allow insertion therethrough of a stake.

15. The horticultural container of claim 14 herein said anchoring means further comprises at least one elongated anchoring passage configured to allow a stake to be driven therethrough into the ground at an oblique angle thereto.

16. A method for transplanting trees and other large plants wherein the root balls of the tree and large plant are preserved during transport and relocation to a transplant site for enhanced opportunity of transplant success, said method comprising the steps of:

providing a large plant with an intact root ball, a pre-dug transplant hole, a mechanical lifting device, at least one tether, and a horticultural transplant container having an open top, a wide flat bottom surface, arcuate side walls, and sturdy lifting support means outwardly depending from the bottom half of said arcuate side walls, with said arcuate side a low center of gravity to maintain said horticultural transplant container in an upright position without anchoring in the presence of strong winds;

placing said horticultural transplant container in an upright position with its flat bottom against a supporting surface;

placing said root ball into said horticultural transplant container so that the plant attached thereto is in a substantially upright position;

optionally allowing growth of said plant to take place within said horticultural transplant container;

moving said mechanical lifting device in close proximity to said horticultural transplant container;

attaching at least one said tether between said sturdy lifting support means and said mechanical lifting device;

using said mechanical lifting device to lift said horticultural transplant container in combination with said plant and said root ball contained therein, above said pre-dug transplant hole;

further using said mechanical lifting device to rotate said horticultural transplant container a sufficient amount to initiate gravity-assisted transfer of said root ball into said transplant hole without root ball disruption or damage; and using said mechanical lifting device to move said horticultural transplant container away from said root ball and said transplant hole.

17. The method of claim 16 wherein said horticultural transplant container further comprises at least one drainage hole configured for removal of excess moisture away from said root ball during the time said root ball is positioned within said horticultural container.

18. The method of claim 16 wherein said sturdy lifting support means comprises at least one C-ring having a rugged construction.

19. The method of claim 16 wherein said horticultural transplant container further comprises anchoring means adapted for maintaining said horticultural transplant container in an upright condition when subjected to gale force winds.

20. The method of claim 19 wherein said anchoring means further comprises at least one anchoring passage and an equivalent number of stakes each configured for being driven through one of said anchoring passages and into the ground supporting said horticultural transplant container.

* * * * *